Aug. 7, 1934. G. E. HAWES Re. 19,264
CORSET AND THE LIKE
Original Filed Sept. 13, 1930
Fig. 1.
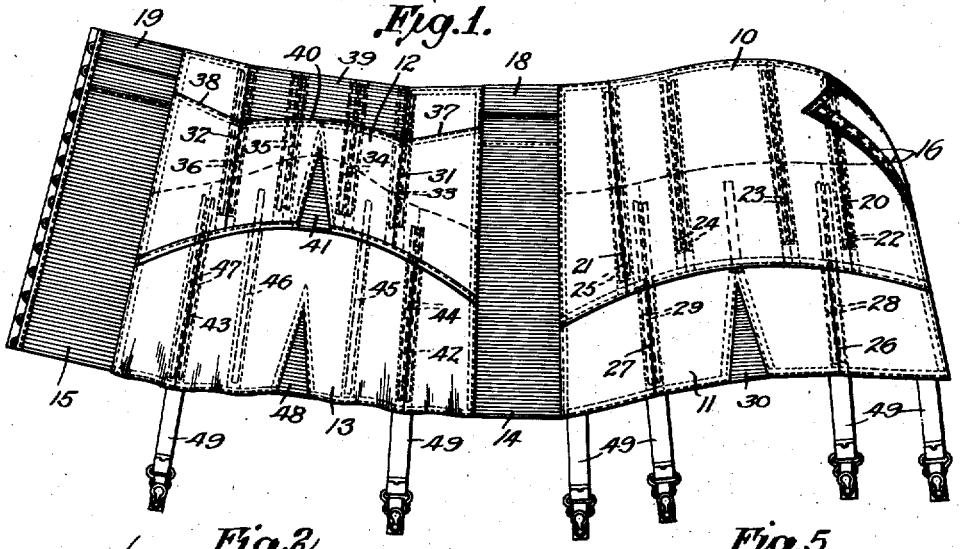
Fig. 2.
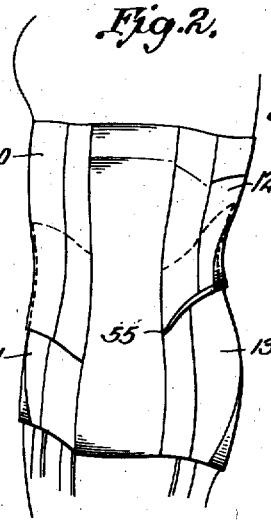
Fig. 3.
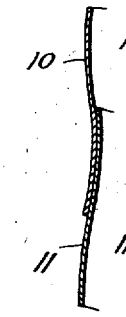
Fig. 4.
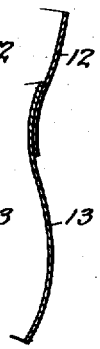
Fig. 5.
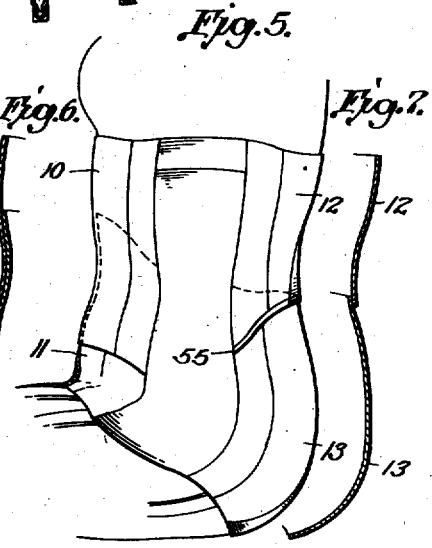
Fig. 6.
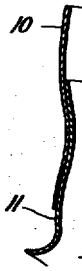
Fig. 7.
Fig. 8.
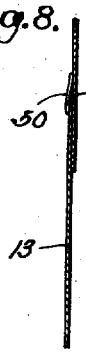
Fig. 9.
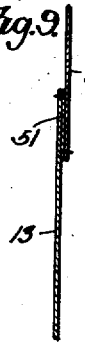
Fig. 10.
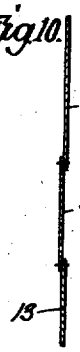
Fig. 11.
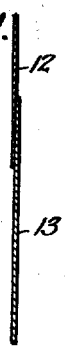
Inventor:
George E. Hawes
Attorneys:
Blair Curtis & Dunne Reissued Aug. 7, 1934 Re. 19,264

UNITED STATES PATENT OFFICE 19,264

CORSET AND THE LIKE

George E. Hawes, Bridgeport, Conn., assignor to The La Resista Corset Company, Bridgeport, Conn., a corporation of Connecticut Original No. 1,837,865, dated December 22, 1931, Serial No. 481,710, September 13, 1930. Application for reissue January 20, 1933, Serial No. 653,011

17 Claims. (Cl. 2—27)

The present invention relates to improvements in foundation garments, such as corsets and the like, and has for an object to provide a garment of this character which will permits the natural movements of the body as in sitting, walking, stooping, bending over, etc. without disturbing or changing the position of the garment. With corsets, as heretofore constructed, there was a tendency for the back and front to slip as the body assumed various attitudes as sitting or stooping, and at the same time there would be a pulling strain due to elongation of the body and a pushing strain due to shortening, with the result that upon assuming another position the friction of the body would cause the corset to shift from its previous position. There was also a tendency with these corsets, when bending over or sitting, for the upper back edge to draw away and protrude from the body. This was uncomfortable and unsightly, particularly where the wrinkles and protrusions of the shifted corset might show through a tight fitting or thin gown. In order to readjust the corset it was necessary for the wearer to pull and twist it into its proper position.

It is proposed in the present invention to provide a garment having upper and lower parts, preferably overlapped for telescoping movement with respect to each other, and which will cling independently to upper and lower parts of the body so that the natural elongation and shortening of the body in assuming various postures shifts the corset parts relatively to each other, but will not cause them to shift on the body or to protrude, so that the wearer may comfortably assume any natural attitude, without strain on or resistance from the garment, and the same will at all times be in its properly disposed position.

With the above and other objects in view, embodiments of the invention are shown in the accompanying drawing, and these embodiments will be hereinafter more fully described with reference thereto and the invention will be finally pointed out in the claims.

In the drawing:

Figure 1 is a plan of the garment as it appears when laid out flat.

Figure 2 is a side elevation showing the garment in use, and in standing posture.

Figure 3 is a vertical sectional view centrally of the front of the garment.

Figure 4 is a vertical sectional view centrally of the back.

Figure 5 is a side elevation showing the position of the garment in sitting posture.

Figures 6 and 7 are vertical sectional views centrally of front and back in sitting posture.

Figures 8, 9, 10 and 11 are vertical sectional views of modified forms of the invention.

Similar reference characters indicate corresponding parts throughout the several figures of the drawing.

Referring to the drawing, the garment according to the embodiment illustrated in Figures 1 to 7 is a corset of the so-called girdle type, the upper front edge being disposed below the bust of the wearer, but obviously the invention may be incorporated in other types of garments, as for instance a combination garment in which a bust engaging brassière section is provided.

The garment comprises a front section consisting of an upper part 10 and a lower part 11, a back section consisting of an upper part 12 and a lower part 13, an elastic side section 14 secured at its vertical edges to the vertical edges at one side of the front and back sections, and an elastic section 15 secured at one vertical edge to the vertical edge at the other side of the back section. A series of hooks 16 provided along the free vertical edge of the front section are adapted to be hooked with a series of eyes 17 provided on the free vertical edge of the elastic section 15 to secure the garment about the wearer. The elastic sections are formed of webbing, so arranged that they yield laterally but not vertically, and at the upper ends of each elastic section separate elastic pieces 18 and 19 are respectively provided in underlapped relation so that the garment more readily yields and conforms to the body beneath the arms. The front and back sections are preferably formed of non-elastic material, except for elastic inserts that may be provided and will hereinafter be more fully pointed out, but obviously may be made of laterally yieldable elastic material such as the sections 14 and 15, or of any other suitable material.

The upper part 10 of the front section is adapted to engage the diaphragm of the wearer, its lower edge being curved upwardly at the center and extending partially over the abdomen. The lower part 11 is adapted to engage the abdomen and has its upper edge disposed beneath the upper part 10 at a point intermediate the upper and lower edges of the latter, the two portions being secured together along their vertical edges, while the transverse edges are unattached so that one part may have a telescoping slipping action with respect to the other. The unattached transverse edges preferably extend to the elastic side sections so that the garment more readily conforms to different positions of the body.

The upper part is preferably formed from a center and side panels seamed together, as at 20 and 21, and is provided with a series of spaced vertical stays 22, 23, 24 and 25, of whale bone, steel, or the like, the lower ends of which are set back from the lower edge so that this edge may lie flat.

The lower part 11 is also formed from a center and two side panels seamed together as at 26 and 27, and provided along these seams with stays 28 and 29, the upper ends of which terminate below the upper edge so that this edge may lie flat, and these seams and stays of the lower part are arranged in offset relation to those of the upper part, so that in the overlapping portions they will not be superimposed. A triangular elastic gusset inset 30 is provided centrally at the lower edge of the lower part 11.

The upper part 12 of the back section is adapted to gird and engage the upper part of the back above the waist of the wearer, its lower edge being curved upwardly at the center, while the lower portion 13 is adapted to gird and engage the back and hips below the waist, and has its upper edge disposed beneath the upper part at a point substantially above the lower edge thereof, the two portions being secured together along their vertical edges adjacent the elastic sections 14 and 15, while the transverse edges are unattached, so that one portion may have a telescoping slipping action with respect to the other. As shown in Figures 2 and 5, the ends of the upper edge of the lower part 13, and the ends of the lower edge of the upper part 12 are anchored at or near the sides of the body of the wearer, and in the proximity of the hips. With this construction, it is to be noted that the upper part 12 cooperates with the front portion 10 to restrain the body at and above the waist line without restraining that portion of the body lying below the waist line so as to restrict movement of the upper part with respect to that portion of the body lying below the waist line; and the lower part 13 cooperates with the front part 11 to restrain the back of the wearer below the waist line without restraining any portion of the back lying at or above the waist line so as to restrict movement of the lower part with respect to that portion of the body lying at and above the waist line.

The upper part 12 of the back section is formed from a center and two side panels seamed together, as at 31 and 32, and is provided with a series of spaced vertical stays 33, 34, 35 and 36, the lower ends of which are set back from the lower edge so that this edge may lie flat. The side panels preferably include separate upper end portions secured to the lower portions by transverse seams 37 and 38, and the center panel preferably includes an upper portion of laterally yieldable elastic material 39 secured to the lower portion by a transverse seam 40. This construction is such that the back part 12 more readily conforms to and yields to the upper back portions of the wearer. A triangular elastic gusset insert 41 is preferably provided centrally at the lower edge of the part 12.

The lower part 13 is formed from a center and two side panels, seamed together, as at 42 and 43, and provided with a series of spaced vertical stays 44, 45, 46 and 47, the upper ends of which terminate below the upper edge so that this edge may lie flat, and these seams and stays are arranged in offset relation to those of the upper part so that in the overlapped portions they will not be superimposed. A triangular elastic gusset insert 48 is preferably provided centrally at the lower edge of the lower part 13.

Hose supporters 49 are secured at suitable points to the lower edge of the garment.

In both the front and back sections the disposition of the edges of the upper and lower parts is such that upon elongation or shortening of the body one part will not be pulled or pushed by the part of the body engaged by the other part.

Upon assuming a sitting posture, as shown in Fig. 5, the parts of the garment remain in their respective position on the upper and lower parts of the body, the lengthening and shortening causing the overlapping portions to telescopically slide with respect to each other. Irrespective of the position of the body the parts of the garment remain in their proper relation, so that upon resuming any position after having been in any other position, as when again resuming a standing position after sitting, the parts are automatically maintained in their proper place upon the body. The construction furthermore permits movement of the body without pulling or pushing strains, and in whatever position is assumed there will be no wrinkling protrusion, or unsightly distortion of the garment.

In this connection it is to be noted that the construction of the back portion which I have described and shown has another advantage: no additional pressure on the diaphragm of the wearer is created as the wearer bends or sits, which pressure always occurs with other corset constructions. I overcome this undesirable pressure (which in other corsets is caused by the pulling action of the anchored lower rear portion, resulting in a corresponding constricting action of the upper and front portion) by breaking the diagonal line of pull which may be considered as extending from the upper front portion across the side of the wearer to the lower back portion of the corset. I accomplish this result by dividing the back of the corset into two separate relatively movable pieces 12 and 13, as above described, and by extending the division between the two pieces across the back of the wearer and terminating the ends thereof at points 55 which lie in the vicinity of the hips. With this arrangement, when the wearer bends, the upper front and back portions 10 and 12 respectively pivot as a unit about points of termination 55 allowing the upper front portion 10 to move forward, unrestricted by the anchored lower rear portion 13, the division in the back providing a break in the diagonal line of pull.

In Fig. 8 I have shown a modification in which the upper edge of the lower part is secured to the upper part by elastic straps 50, and which will yield to permit the telescoping action.

In Fig. 9 I have shown a modification, in which the upper edge of the lower part is secured to the lower edge of the upper part by a thin piece of stretchable fabric material 51, either elastic or non-elastic.

In Fig. 10 I have shown a modification in which the upper and lower sections are not overlapped as in the other forms, but are separated and connected together by a section of elastic webbing 52, so arranged as to yield vertically.

In Fig. 11 I have shown a modification in which the upper part has its lower edge disposed beneath the upper portion of the lower part.

While I have shown a garment in which both the front and back sections include relatively movable upper and lower parts it will be understood that the invention also contemplates a garment in which either the front or the back sections are of any other suitable construction. It will also be understood that the invention may be incorporated in a garment having vertically disposed lacings for adjustment.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:—

1. In a foundation garment, a back portion comprising an upper part adapted to engage the body at the waist line and a lower part adapted to engage the body below the waist line, said upper and lower parts being vertically offset and overlapped one with respect to the other below the waist line and adapted to independently maintain their positions upon the body upon relative movement of the body below the waist line, and whereby said overlapped portions have telescoping action with respect to each other through the movement of said lower part upon lengthening and shortening of the vertebral line of the wearer below the waist line upon assuming sitting and standing postures.

2. In a foundation garment, a back portion comprising an upper part adapted to engage the body at the waist line and a lower part adapted to engage the body below the waist line, said upper and lower parts being overlapped one with respect to the other below the waist line and adapted to independently maintain their positions upon the body upon relative movement of said parts of the body, and whereby said overlapped portions have telescoping movement with respect to each other, vertically arranged stays in said upper and lower parts having their ends contiguous to the overlapped portions terminating in spaced relation to the edges of said overlapped portions.

3. In a foundation garment, a back portion comprising an upper part adapted to engage the body at the waist line and a lower part adapted to engage the body below the waist line, said upper and lower parts being overlapped one with respect to the other below the waist line and adapted to independently maintain their positions upon the body upon relative movement of said parts of the body, and whereby said overlapped portions have telescoping movement with respect to each other, vertically arranged stays in said upper and lower parts, the stays of the upper part being arranged in offset relation to the stays of the lower part, whereby said stays are not superimposed in the overlapping portions of said parts.

4. In a foundation garment, a front portion, side portions, and a back portion disposed between said side portions comprising an upper part adapted to engage the wearer's body above the hip joints, and a lower part having its top edge below the top edge of the upper part and adapted to engage the body below the hip joints and embrace the buttocks, the bottom edge of the upper part being above the bottom edge of the lower part, the ends of said bottom edge of the upper part and said top edge of the lower part being anchored one with respect to the other, whereby said ends maintain a substantially constant relation to each other, said edges between said anchored ends being relatively movable and whereby said back portion is adapted to expand and contract in correspondence with the lengthening and shortening of the vertebral line of the wearer upon assuming sitting and standing postures.

5. In a foundation garment a front portion, side portions, and a back portion disposed between said side portions comprising an upper part adapted to engage the wearer's body above the hip joints, and a lower part having its top edge below the top edge of the upper part and adapted to engage the body below the hip joints and embrace the buttocks, the bottom edge of the upper part being above the bottom edge of the lower part, the ends of said bottom edge of the upper part of said top edge of the lower part being anchored one with respect to the other, whereby said ends maintain a substantially constant relation to each other, said edges between said anchored ends being relatively movable and whereby said back portion is adapted to expand and contract in correspondence with the lengthening and shortening of the vertebral line of the wearer upon assuming sitting and standing postures, and hose supporters secured to and extending below said lower part of the back portion.

6. In a foundation garment, a front portion, side portions, and a back portion disposed between said side portions comprising an upper part adapted to engage the wearer's body at the waist line and above the hip joints, and a lower part having its top edge below the top edge of the upper part and adapted to engage the body below the hip joints and embrace the buttocks, the bottom edge of the upper part being above the bottom edge of the lower part, the ends of said bottom edge of the upper part being below the waist line and anchored, the ends of the top edge of the lower part being below the waist line and said top edge of the lower part being relatively movable with respect to the upper part and whereby said back portion is adapted to expand and contract in correspondence with the lengthening and shortening of the vetebral line of the wearer below the waist line upon assuming sitting and standing postures, said upper and lower parts of the back portion being overlapped to an extent sufficient to maintain said overlapped relation upon maximum expansion of said back portion.

7. In a foundation garment, a front portion, side portions, and a back portion disposed between said side portions comprising an upper part adapted to engage the wearer's body at the waist line and above the hip joints, and a lower part having its top edge below the top edge of the upper part and adapted to engage the body below the hip joints and embrace the buttocks, the bottom edge of the upper part being above the bottom edge of the lower part, the ends of said bottom edge of the upper part being below the waist line and anchored, the ends of the top edg f the lower part being below the waist line and said top edge of the lower part being relatively movable with respect to the upper part and whereby said back portion is adapted to expand and contract in correspondence with the lengthening and shortening of the vertebral line of the wearer below the waist line upon assuming sitting and standing postures, said upper part of the back portion being overlapped exteriorly upon said lower part to an extent sufficient to maintain said overlapped relation upon maximum expansion of said back portion, and whereby protrusion of the upper edge of said lower part is prevented upon expansion of said back portion.

8. In a foundation garment, a front portion extending over the diaphragm, elastic side portions, and a back portion disposed between said side portions comprising an upper part adapted to engage the wearer's body above the hip joints, and a lower part having its top edge below the top edge of the upper part and adapted to engage the body below the hip joints and embrace the buttocks, the bottom edge of the upper part being above the bottom edge of the lower part, the ends of said bottom edge of the upper part and said top edge of the lower part being anchored to said elastic side portions and maintained in substantially constant spaced apart relation thereby, said edges between said anchored ends being relatively movable and whereby said back portion is adapted to expand and contract in correspondence with the lengthening and shortening of the vertebral line of the wearer upon assuming sitting and standing postures.

9. In a foundation garment, a front portion, elastic side portions, and a back portion disposed between said side portions comprising an upper part adapted to engage the wearer's body at the waist line and above the hip joints, and a lower part having its top edge below the top edge of the upper part and adapted to engage the body below the hip joints and embrace the buttocks, the bottom edge of the upper part being above the bottom edge of the lower part, the ends of said bottom edge of the upper part being below the waist line and anchored to said elastic side portions, the ends of the top edge of the lower part being below the waist line and said top edge of the lower part being relatively movable with respect to the upper part and whereby said back portion is adapted to expand and contract in correspondence with the lengthening and shortening of the vertebral line of the wearer below the waist line upon assuming sitting and standing postures, said upper part of the back portion being overlapped upon said lower part to an extent sufficient to maintain said overlapped relation upon maximum expansion of said back portion and whereby protrusion of the upper edge of said lower part is prevented upon expansion of said back portion.

10. In a foundation garment, a back portion, side portions, and a front portion disposed between said side portions comprising an upper part adapted to engage the wearer's diaphragm, and a lower part having its top edge below the top edge of the upper part and adapted to engage the abdomen, the bottom edge of the upper part being above the bottom edge of the lower part, the ends of said bottom edge of the upper part and said top edge of the lower part being below the waist line and being anchored one with respect to the other, whereby said ends maintain a substantially constant relation to each other, said bottom and top edges of the respective upper and lower parts being relatively movable and whereby said front portion is adapted to expand and contract in correspondence with the lengthening and shortening of the central front line of the wearer upon assuming standing and sitting postures, said upper part of the front portion being overlapped exteriorly upon said lower part to an extent sufficient to maintain said overlapped relation upon maximum expansion of said front portion, and whereby protrusion of the upper edge of said lower part is prevented upon expansion of said front portion.

11. In a foundation garment, a front portion, side portions, and a back portion, said back portion comprising an upper part and a vertically offset lower part overlapping said upper part below the waist line, said parts adapted to respectively engage relatively movable parts of the body and to independently maintain their positions upon the body upon relative movement of said parts of the body, the upper edge of said lower part having its end portions disposed below the waist line and anchored to said side portions below the waist line and being relatively movable between said side portions whereby said back portion is adapted to expand and contract through movement of said lower part in correspondence with the lengthening and shortening of the vertebral line of the wearer below the waist line upon assuming sitting and standing postures.

12. In a foundation garment, a front portion, side portions and a back portion, said back portion being fixed at each side along a line extending in a substantially vertical direction from a point above the hip joints to a point below the hip joints and in a lateral line with the buttocks, said back portion being vertically expansible below the waist line and extending between an upper point above the hip joints and a lower point below the hip joints and embracing the buttocks, and whereby said back portion is adapted to expand and contract in correspondence with the lengthening and shortening of the vertebral line of the wearer below the waist line upon assuming sitting and standing postures.

13. In a foundation garment, a front portion, side portions and a back portion, said side portions being relatively non-stretchable in a substantially vertical direction from a point above the hip joints to a point below the hip joints in a lateral line with the buttocks, said back portion being vertically expansible below the waist line and extending between an upper point above the hip joints and a lower point below the hip joints and embracing the buttocks, and whereby said back portion is adapted to expand and contract in correspondence with the lengthening and shortening of the vertebral line of the wearer below the waist line upon assuming sitting and standing postures.

14. In a foundation garment, a front portion, side portions and a back portion, said side portions being stretchable laterally and relatively nonstretchable in a substantially vertical direction from a point above the hip joints to a point below the hip joints and in a lateral line with the buttocks, said back portion being vertically expansible below the waist line and extending between an upper point above the hip joints and a lower point below the hip joints and embracing the buttocks, and whereby said back portion is adapted to expand and contract in correspondence with the lengthening and shortening of the vertebral line of the wearer below the waist line upon assuming sitting and standing postures.

15. In a foundation garment, a front portion, side portions, and a back portion, said back portion comprising an upper part and a vertically offset lower part overlapping said upper part below the waist line, the upper edge of said lower part having its end portions disposed below the waist line and anchored to said side portions and its central portion extended upwardly to provide an extended vertebrae engaging portion and being relatively movable between said side portions whereby said back portion is adapted to expand and contract through movement of said lower part in correspondence with the lengthening and shortening of the vertebral line of the wearer below the waist line upon assuming sitting and standing postures.

16. In a foundation garment, a front portion extending over the diaphragm, side portions connected to said front portion, and a back portion disposed between said side portions comprising an upper part and a vertically offset lower part secured to the side portions, said upper part adapted to engage the wearer's body above the hip joints and at the waist line and said lower part adapted to engage the body below the hip joints and embrace the buttocks, the transverse edge of the lower part being arranged for upright movement relatively to the transverse edge of the upper part, and whereby said back portion is adapted to expand and contract in correspondence with the lengthening and shortening of the vertebral line of the wearer below the waist line upon assuming sitting and standing postures, said side portions having substantial vertical stability in lateral alignment with said transverse edges of the back portion.

17. A foundation garment comprising, in combination, a front portion, a back portion comprising an upper part cooperative with said front portion to restrain the surface of the back of the wearer at the waist line and above without restraining any portion of the surface of the back below the waist line so as to restrict movement of the upper part with respect to the surface of the back below the waist line; and a lower part having a restraining portion confining only the portion of the body below the waist to restrain the surface of the back below the waist line without restraining any portion of the surface of the back above the waist line so as to restrict movement of the lower part with respect to the surface of the back above the waist line; said upper and lower parts being vertically offset and overlapped, one with respect to the other, and adapted to maintain independently their positions upon the body upon relative movement of the body below the waist line whereby said overlapping portions have telescoping action with respect to each other through the movement of said parts upon the lengthening and shortening of the surface of the back of the wearer upon assuming sitting and standing postures.

GEORGE E. HAWES.